(12) United States Patent
Dearsley et al.

(10) Patent No.: US 10,958,845 B2
(45) Date of Patent: Mar. 23, 2021

(54) CAMERA WITH ROTATABLE SENSOR (71) Applicant: Microsoft Technology Licensing, LLC, Redmond, WA (US)

(72) Inventors: Simon Cameron Dearsley, Bellevue, WA (US); Kae-Ling Jacquline Gurr, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/460,005

(22) Filed: Jul. 2, 2019

(65) Prior Publication Data

US 2020/0336669 A1 Oct. 22, 2020

Related U.S. Application Data (60) Provisional application No. 62/834,659, filed on Apr. 16, 2019.

(51) Int. Cl.
*H04N 5/232* (2006.01)
*H04N 5/225* (2006.01)

(52) U.S. Cl.
CPC ....... *H04N 5/23299* (2018.08); *H04N 5/2252* (2013.01); *H04N 5/2253* (2013.01)

(58) Field of Classification Search
CPC . H04N 5/23299; H04N 5/2252; H04N 5/2253
See application file for complete search history.

(56) References Cited

U.S. PATENT DOCUMENTS

| 5,082,223 A | 1/1992 | Ording et al. |
| 5,930,544 A * | 7/1999 | Tseng ............... H04N 5/2259 348/374 |
| 7,046,287 B2 * | 5/2006 | Nishino ............. H04M 1/0216 348/333.06 |
| 7,064,789 B1 * | 6/2006 | Shono ................. H04N 5/2252 348/219.1 |
| 7,528,885 B2 * | 5/2009 | Chou ................... H04N 5/2252 348/14.02 |

(Continued)

FOREIGN PATENT DOCUMENTS

| CN | 208647163 U | 3/2019 |
| EP | 2259571 A2 | 12/2010 |

(Continued)

OTHER PUBLICATIONS

"International Search Report and Written Opinion Issued in PCT Application No. PCT/US20/025858", dated Jun. 9, 2020, 12 Pages.

*Primary Examiner* — Gevell V Selby
(74) *Attorney, Agent, or Firm* — Alleman Hall Creasman & Tuttle LLP (57) ABSTRACT

Examples are presented herein that relate to rotation of a sensor assembly relative to a housing of a camera system. One example provides a camera system coupled to a display device, the camera system comprising a housing, a sensor assembly arranged within the housing and rotatable with respect to the housing, the sensor assembly comprising an image sensor configured to obtain image data for display by the display device, and a manual rotation mechanism coupled to the sensor assembly, the manual rotation mechanism configured to be manually actuated from outside the housing to rotate the sensor assembly with respect to the housing.

19 Claims, 11 Drawing Sheets

(56) References Cited

U.S. PATENT DOCUMENTS

| | | |
|---|---|---|
| 7,630,625 B2 | 12/2009 | Seita |
| 9,879,816 B2 | 1/2018 | Woodcock |
| 2004/0023684 A1* | 2/2004 | Sato .................... H04M 1/0218 |
| | | 455/550.1 |
| 2005/0157197 A1 | 7/2005 | Bang et al. |
| 2014/0085533 A1 | 3/2014 | Celia |
| 2015/0036047 A1 | 2/2015 | Bledsoe |
| 2016/0014317 A1* | 1/2016 | Yoshino .................... G06T 1/20 |
| | | 348/211.1 |
| 2016/0191770 A1* | 6/2016 | Taniguchi ................ G02B 7/16 |
| | | 348/374 |
| 2017/0031235 A1 | 2/2017 | Kubotera et al. |
| 2017/0171440 A1 | 6/2017 | Park et al. |
| 2018/0098029 A1 | 4/2018 | Cassini et al. |

FOREIGN PATENT DOCUMENTS

| | | |
|---|---|---|
| WO | 2018192558 A1 | 10/2018 |
| WO | 2018214157 A1 | 11/2018 |

\* cited by examiner

CAMERA WITH ROTATABLE SENSOR

CROSS REFERENCE TO RELATED APPLICATIONS

This application claims priority to U.S. Provisional Patent Application Ser. No. 62/834,659, filed Apr. 16, 2019, the entirety of which is hereby incorporated herein by reference for all purposes.

BACKGROUND

Cameras and graphical displays may be integrated into computing systems or may take the form of separate peripheral devices. In either scenario, such computing systems may enable video conferencing to allow communications in real-time through the sharing of video captured by a camera. The camera may be located near the graphical display during conferencing so that a subject can view a remote camera feed presented by the graphical display while also being within the field of view of the camera.

SUMMARY

Examples are presented herein that relate to rotation of a sensor assembly relative to a housing of a camera system. One example provides a camera system coupled to a display device, the camera system comprising a housing, a sensor assembly arranged within the housing and rotatable with respect to the housing, the sensor assembly comprising an image sensor configured to obtain image data for display by the display device, and a manual rotation mechanism coupled to the sensor assembly, the manual rotation mechanism configured to be manually actuated from outside the housing to rotate the sensor assembly with respect to the housing.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
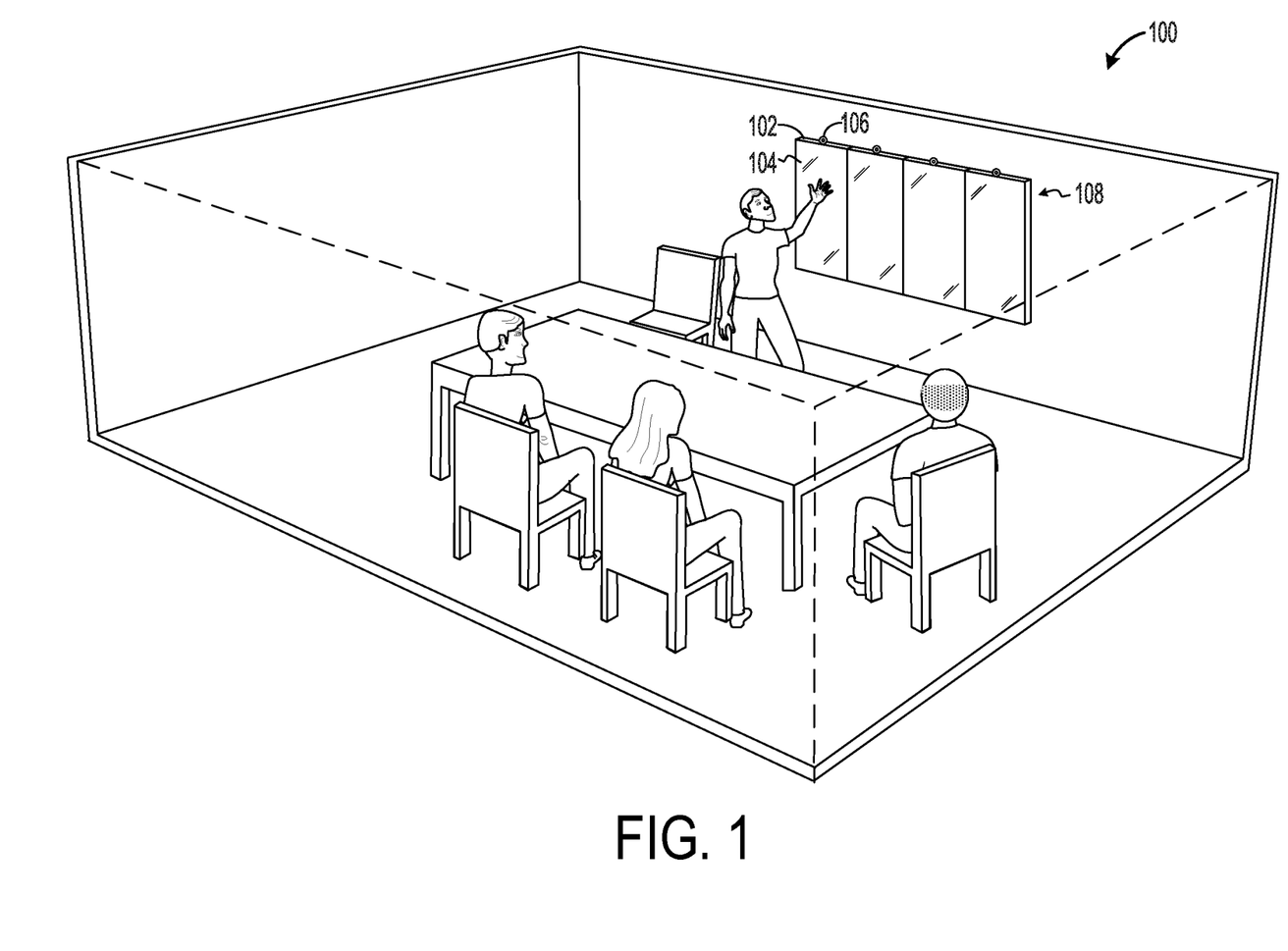
FIG. 1 shows an example use scenario for a display device and a camera according to aspects of the present disclosure.

FIG. 1 shows an example use scenario 100 in which a display device 102 is used in a conference room. Display device 102 includes a display 104 that may present graphical content and a camera system 106. In this example, graphical display 104 extends to an edge of display device 102 in which a bezel of the display device partially or fully resides behind a face of display 104 when viewed from a front side of the display 104. This configuration may enable multiple display devices to be tiled to form a larger composite display 108 while minimizing or even eliminating visibility of the bezel. However, display device 102 may have other configurations than that shown, including a configuration in which display 104 is surrounded by a more substantial bezel.

Camera system 106 may be mounted to or rest upon display device 102, and may be movable relative to display device 102. In some examples, camera system 106 may be configured to removably mount on to or interface with one or more receiving ports of display device 102. For example, an electronic connector of camera system 106 may connect to a corresponding electronic connector of display device 102. As another example, camera system 106 and/or display device 102 may include one or more magnets to attract corresponding magnets of the other device. A local camera feed received from camera system 106 may be received over a wired or wireless interface of display device 102. The local camera feed may be transmitted from display device 102 to a remote computing system via a communications network, over a wired or wireless interface of display device 102.

Figure 2A:
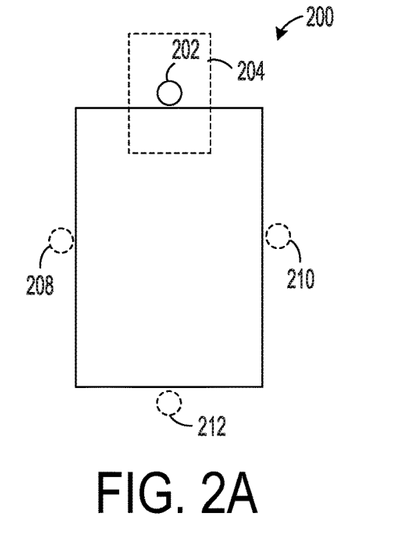
FIG. 2A schematically shows an example display device having a camera in a portrait orientation in a single unit configuration.
Figure 2B:
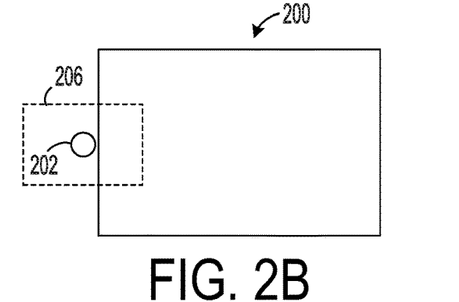
FIG. 2B shows the display device and camera in a landscape orientation according to aspects of the present disclosure.
Figure 2C:
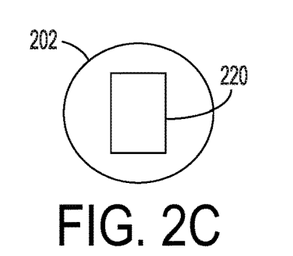
FIG. 2C schematically shows the image sensor of the camera of FIG. 2A in a portrait orientation, and FIG. 2D schematically shows the image sensor of the camera of FIG. 2B in a landscape orientation.

In some examples, a display device may be rotatable to allow a user to view and interact with contact on the display device at various display orientations. For example, a display device may be mounted on a wall or a floor-based stand via a mounting assembly that enables users to rotate the display device. FIG. 2A schematically shows an example display device 200 having a camera 202 in a portrait orientation in a single unit configuration. An image sensor in the camera 202 may have a rectangular shape that outputs frames of rectangular images. With reference also to FIG. 2C, a sensor assembly including an image sensor 220 inside camera 202 is also oriented in a portrait orientation, as represented by 204 in FIG. 2A, such that the field of view and aspect ratio are aligned with the portrait orientation of the display.

Figure 2D:
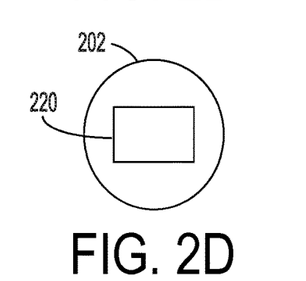

A user may rotate display device 200 ninety degrees from a portrait orientation to a landscape orientation, such that the displayed content may also be rotated ninety degrees along with the display device 200. FIG. 2B shows display device 200 in a landscape orientation, where camera 202 has physically rotated with rotation of display device 200 such that the sensor assembly and image sensor 220 inside camera 202 is also oriented in a landscape orientation, represented by 206 and FIG. 2D. Accordingly, this configuration may allow camera 202 to capture a suitable height of a scene for display in a portrait orientation, and also capture a suitable width of a scene for display in landscape orientation.

Figure 2E:
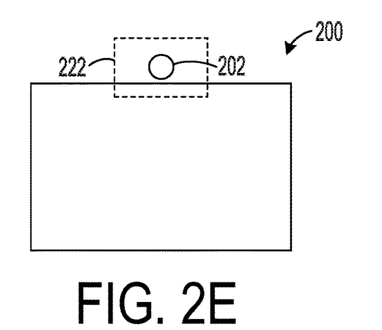
FIG. 2E schematically shows an example display device having a camera in a landscape orientation.

It will be understood that although camera 202 is shown here as being on a top side of display device 200 in portrait orientation, a camera may be disposed in any suitable location relative to the display device. As examples, FIG. 2A further shows other optional locations 208, 210, and 212 for the camera. In one particular example, FIG. 2E schematically shows camera 202 on a top side of display device 200 in a landscape orientation, with the camera sensor also in a landscape orientation as represented by 222 and in FIG. 2D.

Figure 3:
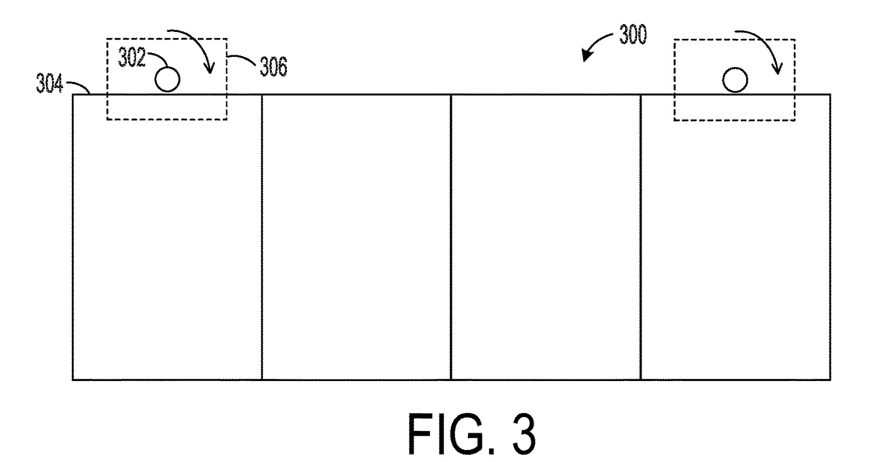
FIG. 3 schematically shows an example composite display formed with multiple display devices according to aspects of the present disclosure.

As mentioned above, multiple display devices may be tiled together to form a composite display. FIG. 3 schematically shows an example composite display 300 formed with four display devices, all in portrait orientation. As described above, each camera of the display devices may also be in a portrait orientation by default. However, in such a tiled composite configuration, a wide field of view may be desired. For example, in a video conference meeting, users may wish to capture as much of the width of the room as possible. As such, having each camera in a portrait orientation in a tiled configuration may result in a poor user experience.

Some display devices and video conferencing systems may utilize an external, remote camera or external camera mounting options to capture such environments. However, such external cameras may come at an additional cost, and may not take advantage of the already existing cameras on display systems. Other solutions may involve manually rotating or moving the entire camera itself, which may not be possible in display systems where the camera housing remains stationary relative to the display and/or where the camera housing is integrated with the display in a particular configuration.

Accordingly, examples are disclosed herein that relate to a camera system that allows users to manually rotate the image sensor assembly inside of a camera relative to the camera housing itself. Briefly, the camera system may include a housing, a sensor assembly arranged within the housing, and a manual rotation mechanism that is actuatable from outside of the housing to rotate the sensor assembly with respect to the housing. For example, in FIG. 3, a sensor assembly inside of camera 302 of display device 304 may be rotated 90 degrees via such a manual rotation mechanism such that a field of view of the camera 302 is in a landscape orientation, as indicated at 306, even where the display device 304 remains in a portrait orientation. Further, the configurations of the present disclosure enable this convenient manual rotation without having to relocate or rotate the entire housing of the camera 302.

Examples of the manual rotation mechanism are described in further detail below. Such a solution allows for a complete, integrated camera and display system that may be flexibly configured for different environments and experiences, while still-remaining self-contained.

Figure 4:
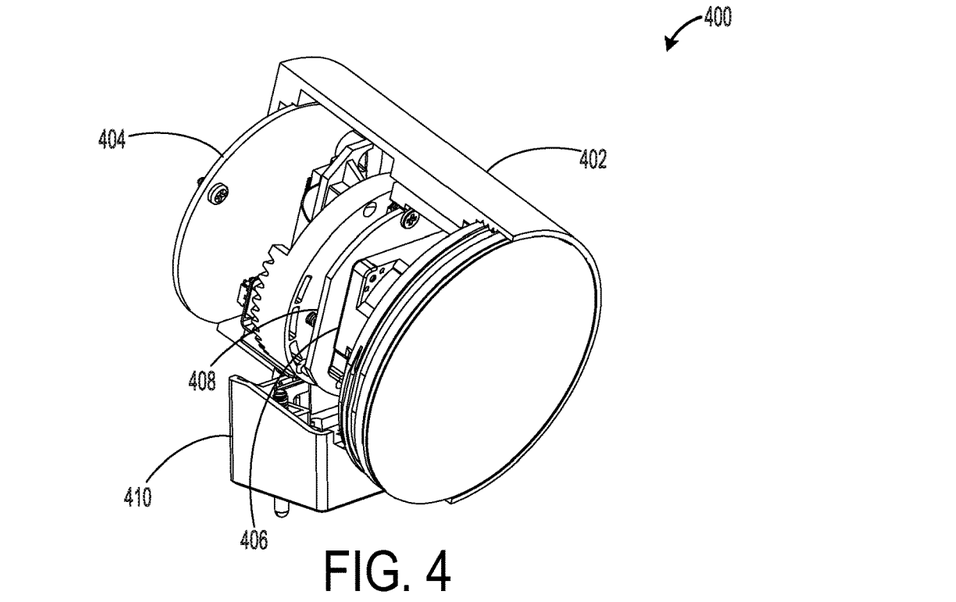
FIG. 4 shows a cutaway perspective view of an example camera system according to aspects of the present disclosure.
Figure 5:
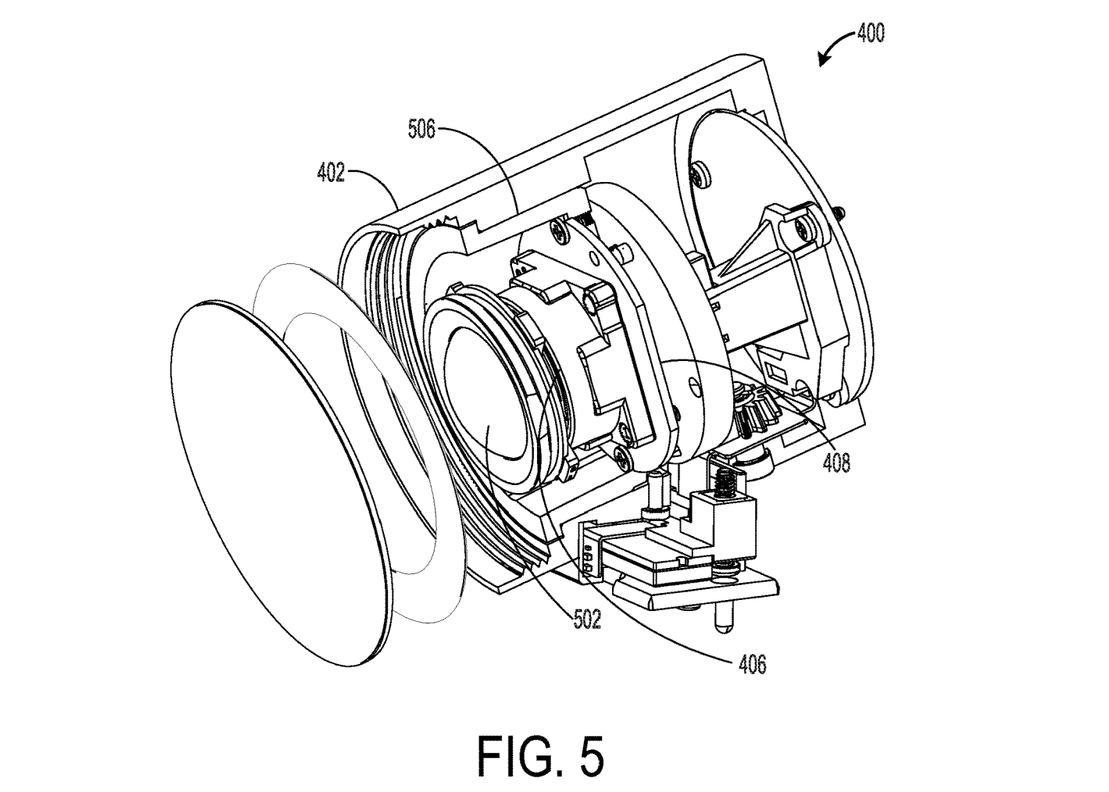
FIG. 5 shows another cutaway perspective and partially exploded view of the camera system of FIG. 4 according to aspects of the present disclosure.

FIG. 4 shows a cutaway perspective view of an example camera system 400 that includes a housing 402, an image signal processor (ISP) printed circuit board (PCB) 404, and a sensor assembly 406 that includes a sensor PCB 408. Sensor assembly 406 further includes an image sensor (not shown) configured to acquire image data as described above. Any suitable image sensor may be used, such as a charge-coupled device (CCD) or complementary metal-oxide-semiconductor (CMOS) sensor technologies. FIG. 4 also shows a camera mount 410, although in other examples such a mount may be omitted. FIG. 5 shows another cutaway perspective view of camera system 400, showing lens assembly 502 and lens and sensor carrier 506.

Figure 6:
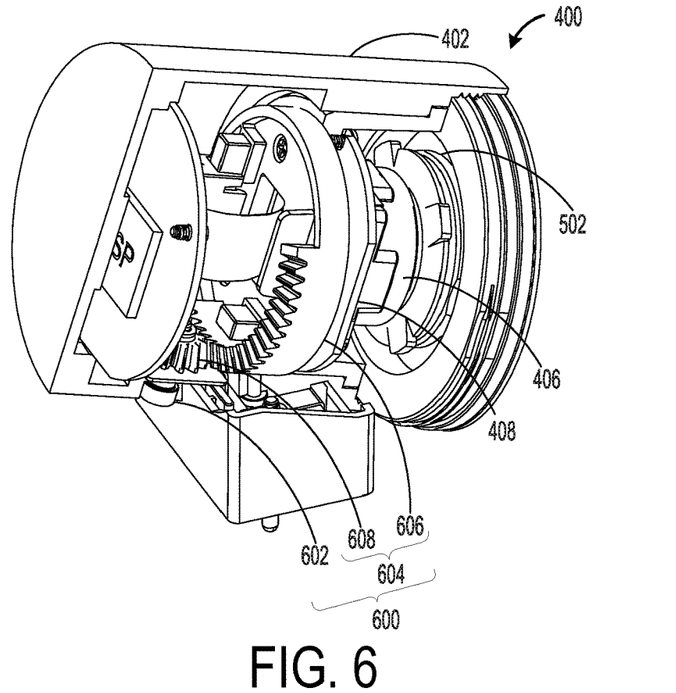
FIG. 6 shows another cutaway perspective view of the camera system of FIG. 4 according to aspects of the present disclosure.

FIG. 6 shows another cutaway perspective view of camera system 400, depicting a manual rotation mechanism 600, including a manually-actuatable rotation structure 602 and a gear system 604 that includes a rack gear 606 and pinion gear 608. Manual rotation mechanism 600 is one example of a manual rotation mechanism that may be used to provide for rotation of sensor assembly 406 within housing 402. Rack gear 606 may be coupled to lens assembly 502, sensor assembly 406, and sensor PCB 408, while pinion gear 608 may be rotatably coupled to housing 402.

Figure 7:
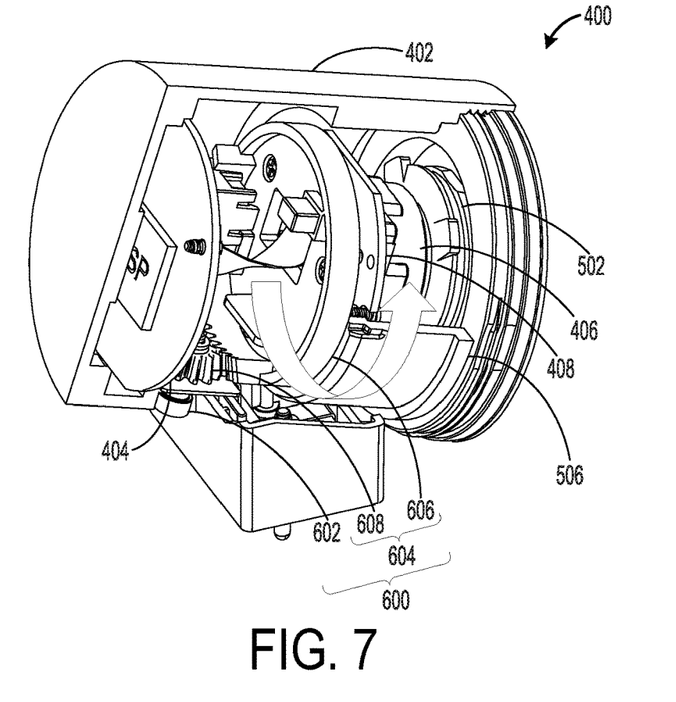
FIG. 7 shows the camera system of FIG. 4 after a 90 degree rotation of a sensor assembly relative to a housing of the camera system according to aspects of the present disclosure.

Such an arrangement may allow lens assembly 502 and sensor assembly 406 (including sensor PCB 408) to rotate along with the rack gear 606 as a unit when gear system 604 is activated to move rack gear 606 relative to pinion gear 608. FIG. 7 shows camera system 400 after rotation by 90 degrees of rack gear 606, lens assembly 502, sensor assembly 406, and lens and sensor carrier 506 relative to housing 402 and to ISP PCB 404. It will be understood that gear system 604 is shown for exemplary purposes, and that other suitable mechanisms for rotating lens assembly 502, sensor assembly 406, and lens and sensor carrier 506 internally and relative to housing 402 and to ISP PCB 404 may be utilized.

Figure 8:
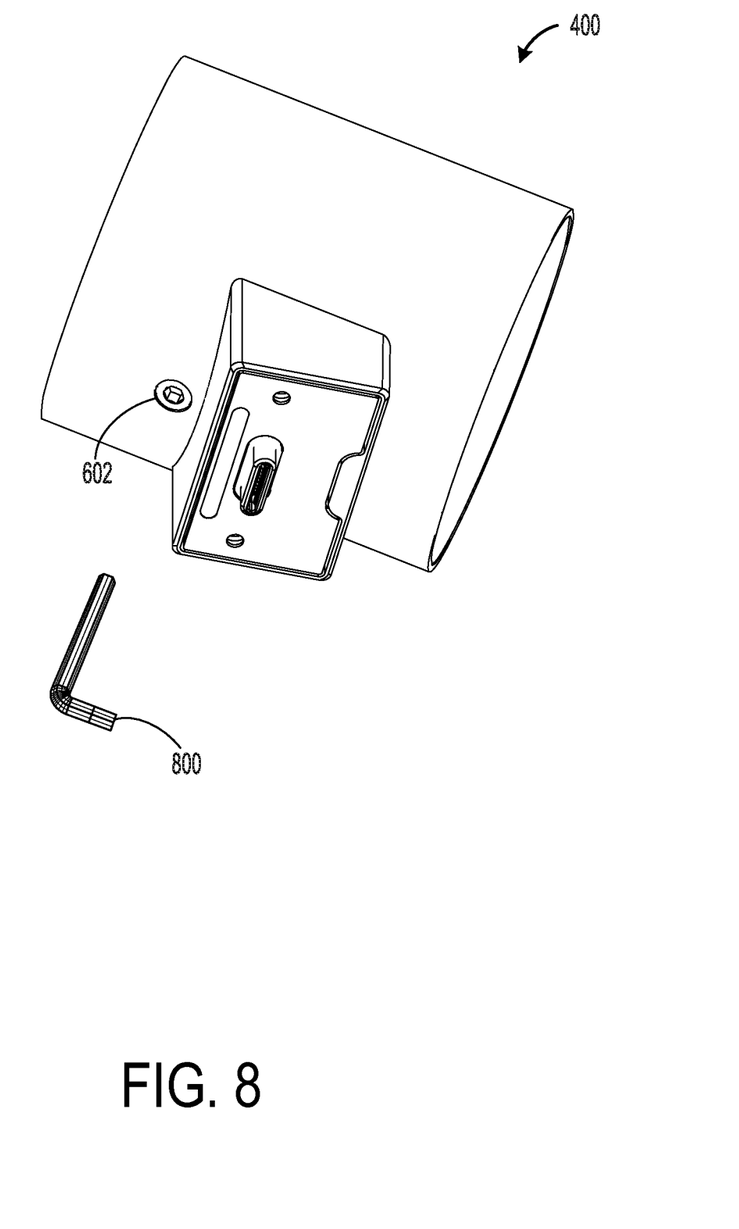
FIG. 8 shows an example structure of a manual rotation mechanism according to aspects of the present disclosure.

As mentioned above, the manual rotation mechanism that provides rotation of the sensor assembly internal to the housing may be actuatable from outside of the housing. FIG. 8 shows a bottom view of structure 602 of manual rotation mechanism 600. Structure 602 may be coupled to the pinion gear 608 and configured to receive an external tool 800 to rotate the pinion and actuate manual rotation mechanism 600. Here, structure 602 is shown as a hex socket and external tool 800 is shown as a hex key, but it will be understood that any other suitable tool combination may be used, e.g. screw and screw driver, key and lock, etc. In other examples, other suitable structures may be used to rotate gear system 604. Accordingly, structure 608 may be actuated in order to rotate sensor assembly 406 relative to housing 402.

Advantageously, the manual rotation mechanism 600 may allow sensor assembly 406 to be conveniently rotated 90 degrees within housing 402 to rotate the image sensor inside sensor assembly 406 from a portrait orientation to a landscape orientation, or vice versa. As described above, this may allow an end user to rotate the image sensor to a desired orientation regardless of the orientation of the housing, and to thereby configure the image sensor orientation appropriately for use with a display device. In some examples, components internal to the housing may function to help stop the rotation at 90 degrees. As one example, magnetic elements may be used, which will be described in further detail below with regard to FIGS. 13 and 14.

Figure 9:
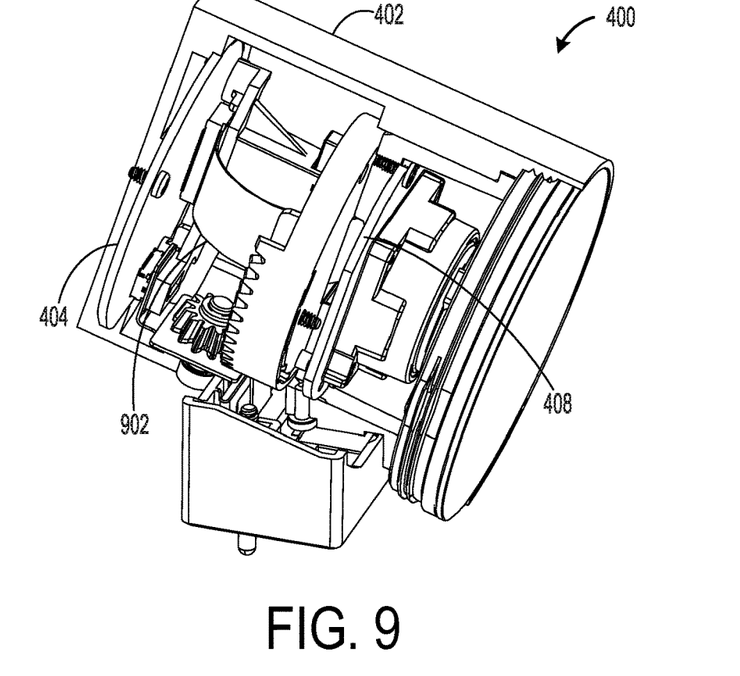
FIGS. 9 and 10 show additional cutaway perspective views of the camera system of FIG. 4, before and after rotation of the sensor assembly respectively according to aspects of the present disclosure.
Figure 10:
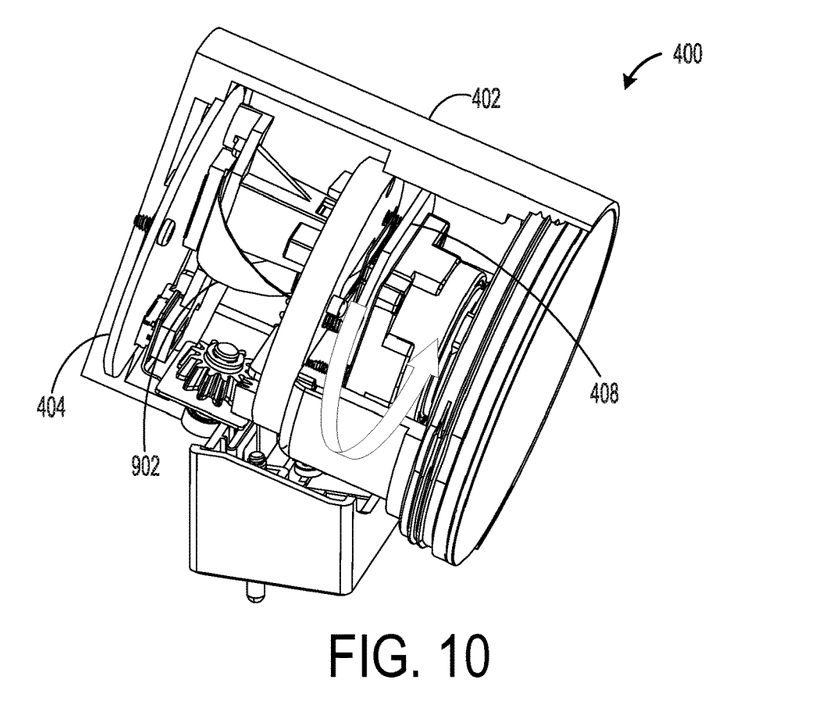
Figure 11:
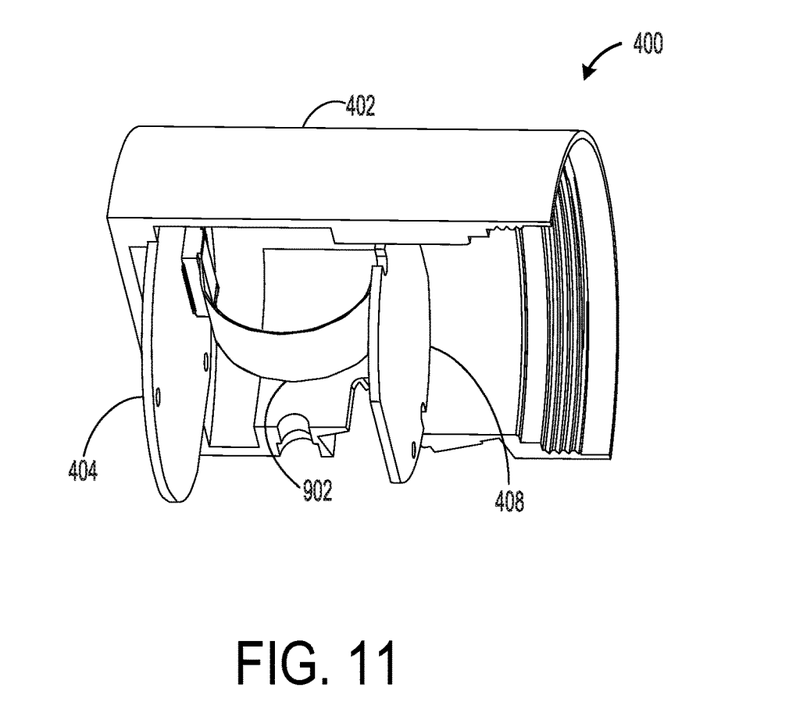
FIGS. 11 and 12 show an example flexible ribbon in the camera system of FIG. 4, before and after rotation respectively according to aspects of the present disclosure.
Figure 12:
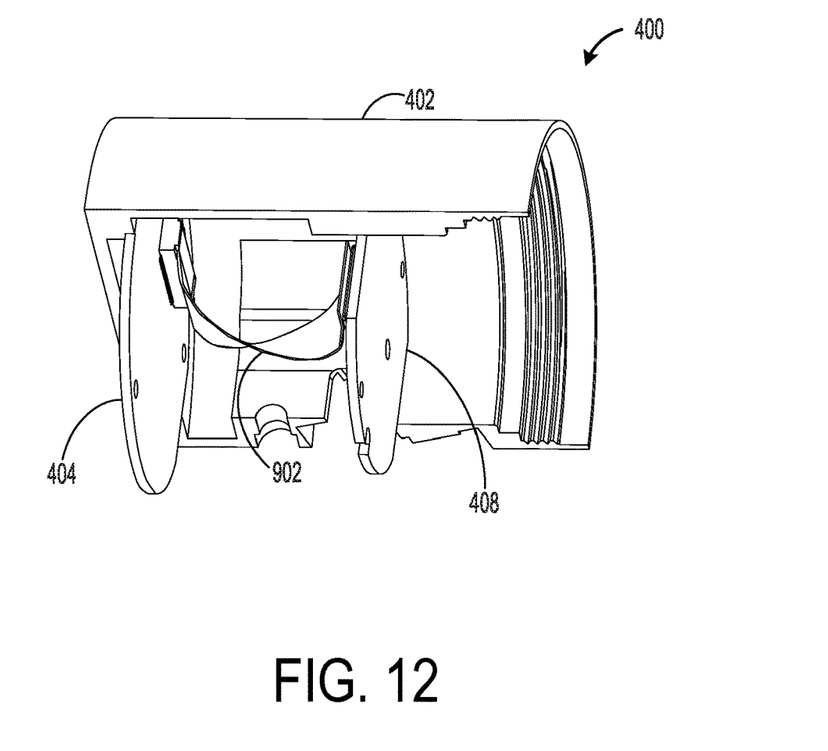

FIGS. 9 and 10 show additional cutaway perspective views of camera system 400, before and after rotation of the sensor assembly respectively. FIGS. 9 and 10 further show a flexible interconnect ribbon cable 902 that communicatively couples ISP PCB 404 to sensor PCB 408. FIGS. 11 and 12 show additional views of flexible interconnect ribbon cable 902 with other internal components removed, before and after rotation respectively.

ISP PCB 404 and sensor PCB 408 may each generate heat during operation of camera system 400. As shown in FIGS. 9 and 10, ISP PCB 404 may be directly mounted to housing 402, e.g. via a screw as shown, although other suitable ways of mounting may be used. Accordingly, and in one potential advantage of the present disclosure, by mounting ISP PCB 404 directly to a back wall of housing 402, the housing may act as a heat sink for ISP PCB 404 to thereby conduct heat away from the board. Housing 402 may be formed from an aluminum material, for example, or other suitable heat sink materials.

Additionally, by laterally spacing the ISP PCB 404 from the sensor PCB 408, the two boards may be thermally isolated from one another to additionally help reduce heat accumulation in the ISP PCB. To enable such lateral spacing, flexible ribbon 902 is provided to electrically connect ISP PCB 404 and sensor PCB 408, while also still allowing rotation of sensor PCB 408 relative to ISP PCB 404 and housing 402. Additionally, fixedly mounting the ISP PCB 404 to the housing 402 ensures a solid thermal connection for efficient heat transfer. Accordingly, the depicted example configuration of ISP PCB 404, sensor PCB 408, and flexible ribbon 902 may thus help to reduce thermal degradation and improve camera performance.

Figure 13:
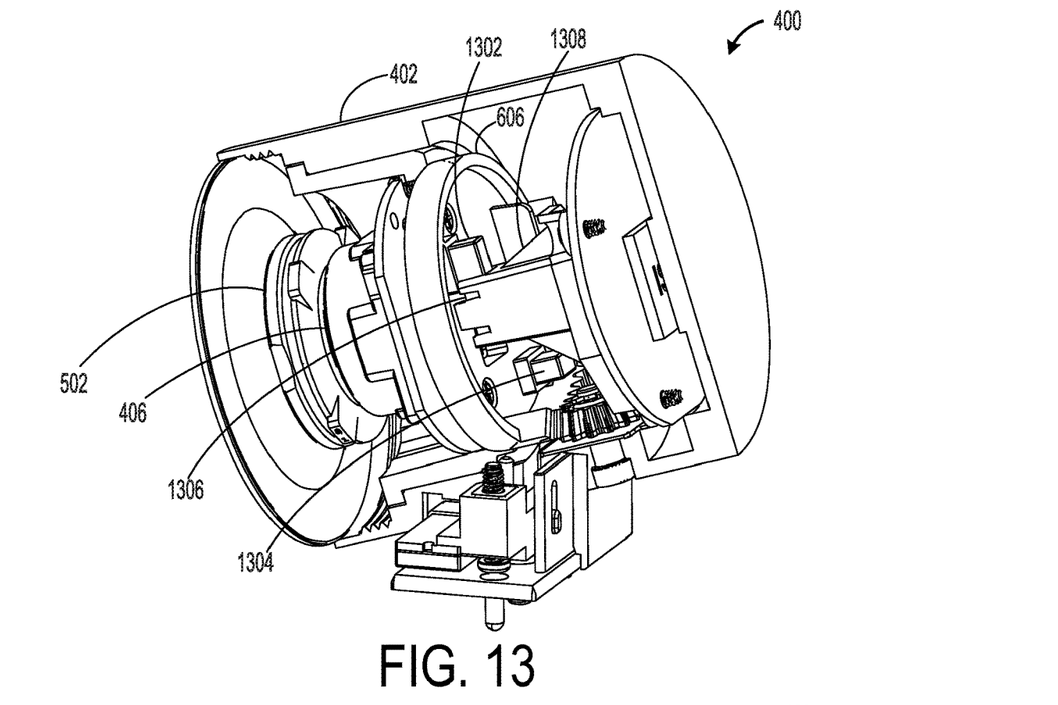
FIGS. 13 and 14 show example magnetic elements of the camera system of FIG. 4 according to aspects of the present disclosure.
Figure 14:
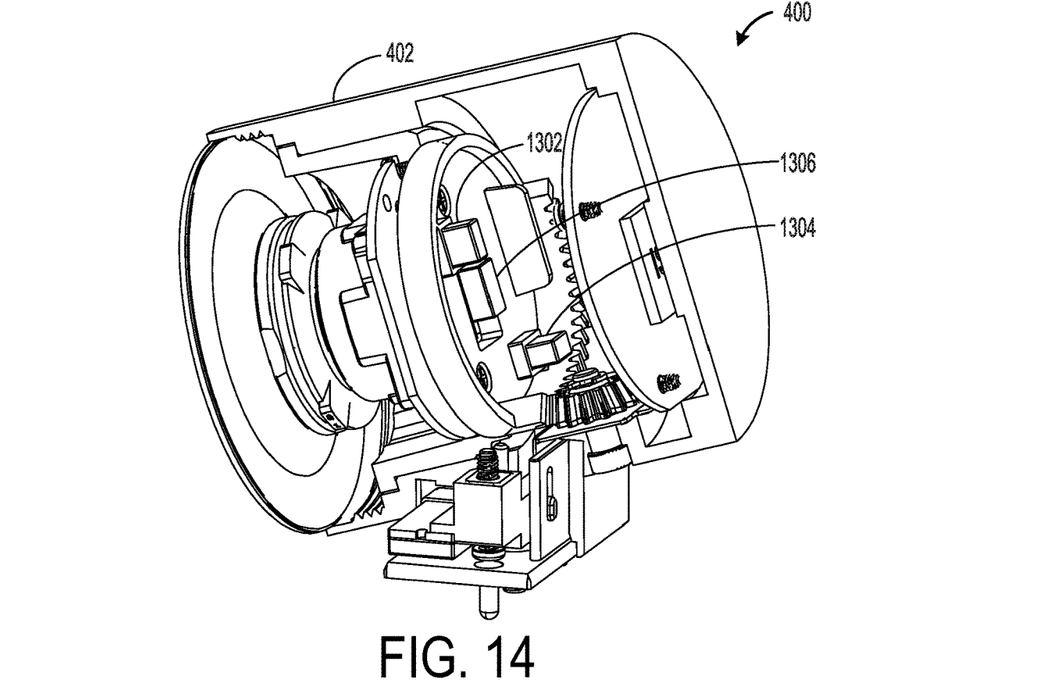

As mentioned above, certain components may be included to help control or limit the rotation of the sensor assembly relative to the housing to 90 degrees back and forth, in order to help facilitate switching between a portrait orientation and a landscape orientation of the sensor assembly. FIGS. 13 and 14 show cutaway perspective views of camera system 400 that depict example magnetic elements 1302, 1304, and 1306 that may be used to help control the rotation of the sensor assembly 406. Magnetic elements 1302 and 1304 are mounted to rack gear 606 and rotate with rack gear 606 relative to housing 402. In contrast, magnetic element 1306 is held by a magnetic carrier 1308 that is secured to housing 402 as to remain in a same position relative to housing 402. FIG. 14 shows magnetic elements 1302, 1304, and 1306 with the magnetic carrier 1308 omitted for clarity purposes. As described below, stationary magnetic element 1306 may be configured to attract rotating magnetic elements 1302 and 1304.

Figure 15:
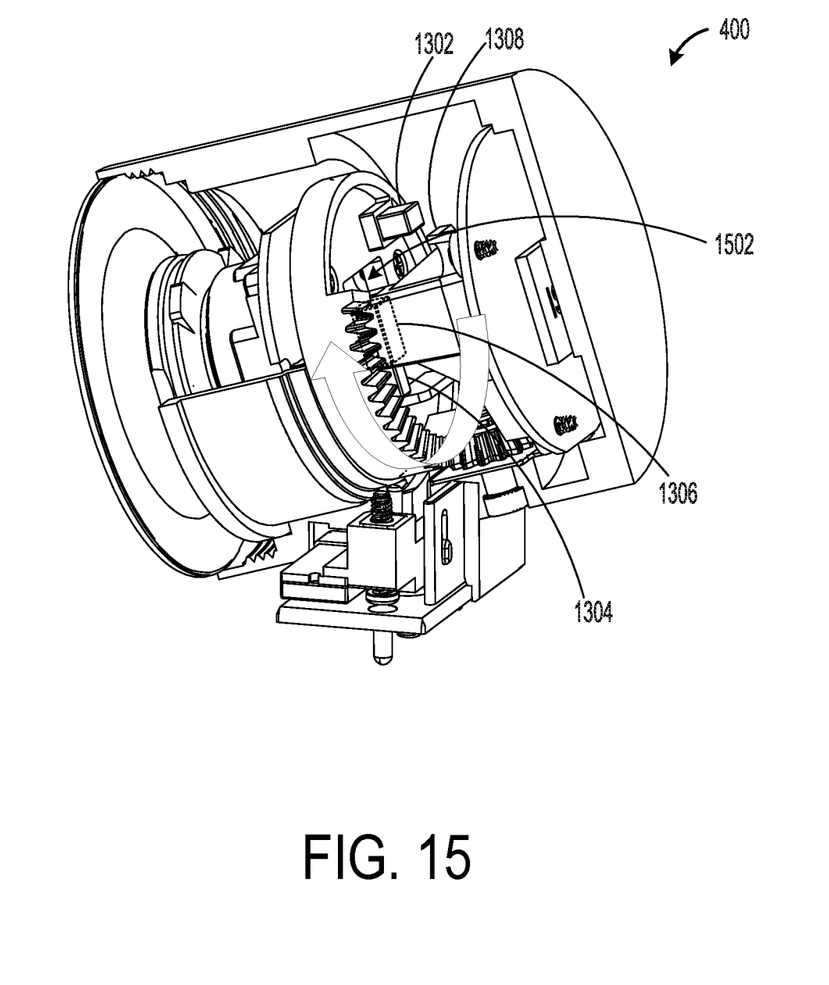
FIG. 15 shows magnetic elements after a 90 degree rotation from the configuration of FIGS. 13 and 14 according to aspects of the present disclosure.

Accordingly, in the configuration of FIGS. 13 and 14 the stationary magnetic element 1306 may function to maintain the rack gear 606 and sensor assembly 406 in the depicted orientation. With reference now to FIG. 15, when the rack gear 606 along with sensor assembly 406 and lens assembly 502 are rotated 90 degrees in the clockwise direction, rotating magnetic element 1304 is "stopped" by magnetic element 1306 held by magnetic carrier 1308. FIG. 15 shows magnetic elements 1302, 1304, and 1306 after a 90 degree rotation from the configuration of FIGS. 13 and 14. Similarly, when rack gear 606 rotates back in the reverse direction, rotating magnetic element 1302 is "stopped" by magnetic element 1306.

Accordingly, the use of magnetic elements may help to ensure a precise 90 degree rotation of the sensor assembly 406, which may help improve user experience. FIG. 15 also shows an opening 1502 formed in rack gear 606 through which the flexible ribbon 902 (not shown in FIG. 15) may be fed.

It will be understood that in other examples, magnetic elements may be omitted. For example, rotation of the rack gear, sensor assembly, and lens assembly may be controlled by other suitable components, such as structural stops that may prevent the rack gear from rotating more than 90 degrees.

Figure 16:
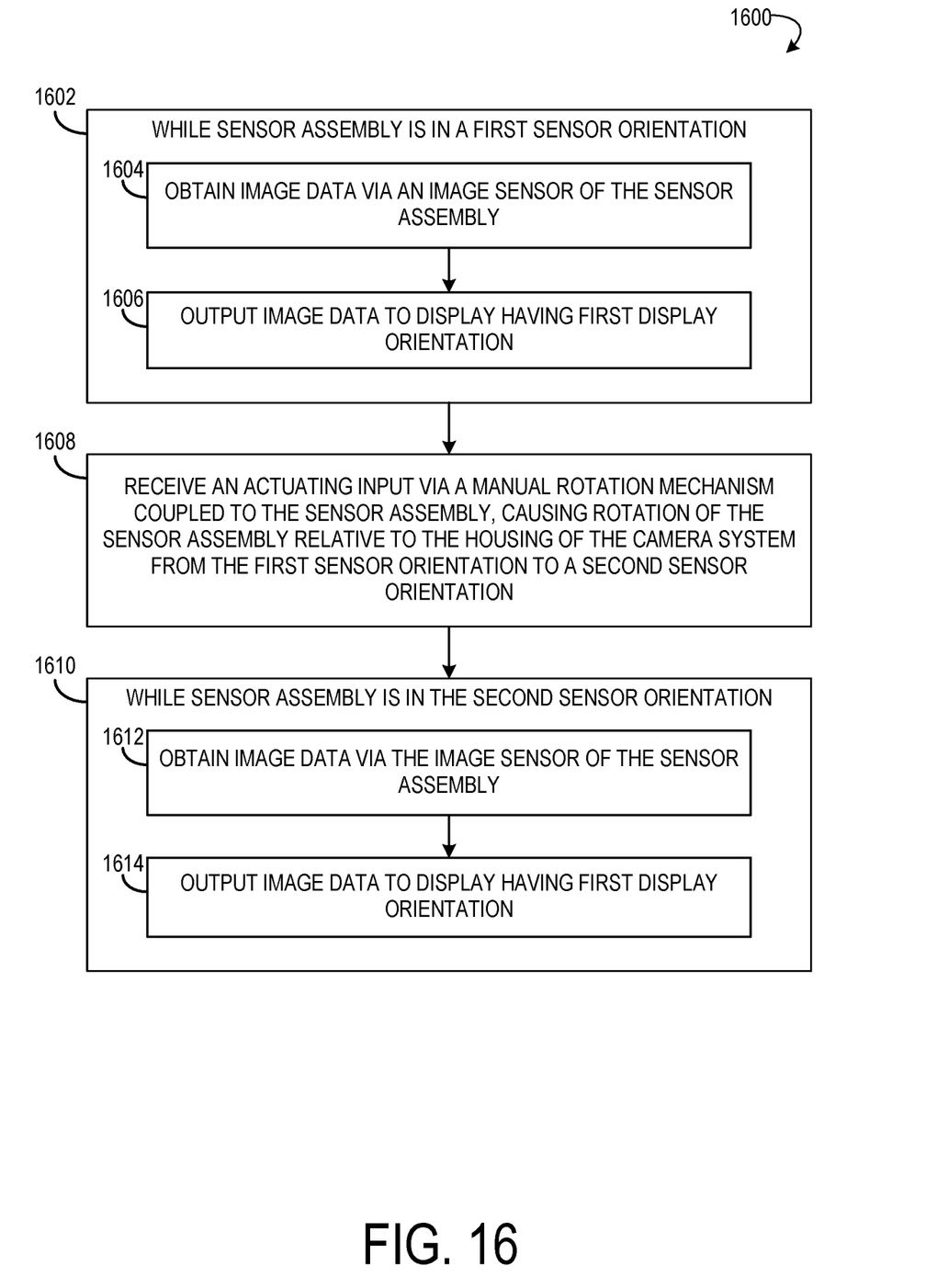
FIG. 16 is a flow diagram showing an example method of operating a camera system having a rotatable sensor assembly according to aspects of the present disclosure.

FIG. 16 shows an example method 1600 of operating a camera system having a rotatable sensor assembly arranged within a housing of the camera system. The following description of method 1600 is provided with reference to the components described herein and shown in FIGS. 1-15 and 17, but it will be appreciated that method 1600 also may be performed in other contexts using other suitable components. Method 1600 includes, while the sensor assembly is in a first sensor orientation at 1602, obtaining image data via an image sensor of the sensor assembly at 1604, and outputting image data to a display having a first display orientation at 1606. As described above, the field of view of the camera system in the first sensor orientation may have an aspect ratio matching the first display orientation (e.g., portrait sensor orientation and portrait display orientation).

Method 1600 further includes, at 1608, receiving an actuating input via a manual rotation mechanism coupled to the rotatable sensor assembly, which causes rotation of the sensor assembly relative to the housing of the camera system from the first sensor orientation to a second sensor orientation. For example, in a scenario where the first sensor orientation is a portrait sensor orientation, the rotation may cause the sensor assembly to be rotated to a landscape sensor orientation. As described above, any suitable manual rotation mechanism may be utilized, such as a manually-actuatable rotation structure coupled to a gear system.

Method 1600 further includes, while the sensor assembly is in the second sensor orientation at 1610, obtaining image data via the image sensor of the sensor assembly at 1612, and outputting image data to the display having the first display orientation at 1614. The field of view of the camera system in the second sensor orientation may have a different aspect ratio than the first display orientation. For example, where the sensor assembly is now rotated to a landscape sensor orientation, the image data may be output to the display remaining in the portrait display orientation.

In some embodiments, aspects of the methods and processes described herein may be tied to a computing system of one or more computing devices. In particular, aspects of such methods and processes may be implemented as a computer-application program or service, an application-programming interface (API), a library, and/or other computer-program product.

Figure 17:
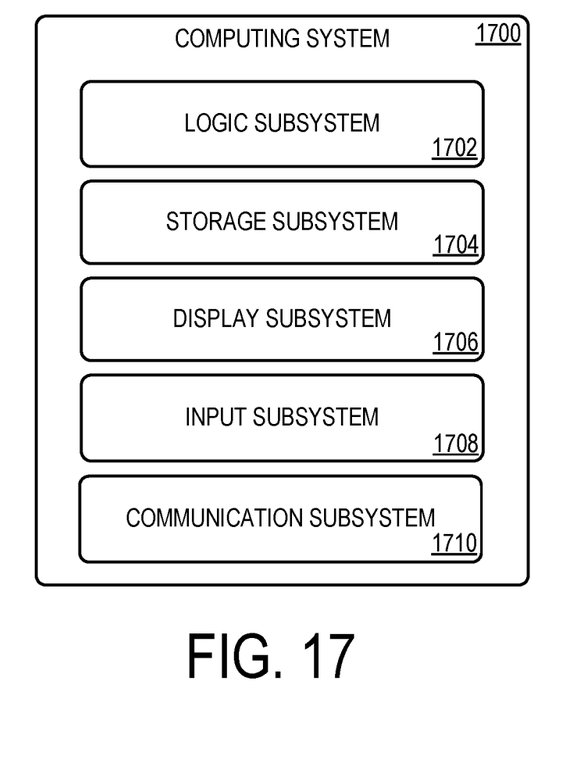
FIG. 17 is a block diagram showing an example computing system according to aspects of the present disclosure.

FIG. 17 schematically shows a non-limiting embodiment of a computing system 1700 that can enact aspects of one or more of the methods and processes described above. Computing system 1700 is shown in simplified form. Computing system 1700 may take the form of display device 102, one or more personal computers, server computers, tablet computers, home-entertainment computers, network computing devices, gaming devices, mobile computing devices, mobile communication devices (e.g., smart phone), and/or other computing devices.

Computing system 1700 includes a logic subsystem 1702 and a storage subsystem 1704. Computing system 1700 may optionally include a display subsystem 1706, input subsystem 1708, communication subsystem 1710, and/or other components not shown in FIG. 17.

Logic subsystem 1702 includes one or more physical devices configured to execute instructions. For example, logic subsystem 1702 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 1702 may include one or more processors configured to execute software instructions. Additionally or alternatively, logic subsystem 1702 may include one or more hardware or firmware logic machines configured to execute hardware or firmware instructions. Processors of logic subsystem 1702 may be single-core or multi-core, and the instructions executed thereon may be configured for sequential, parallel, and/or distributed processing. Individual components of logic subsystem 1702 optionally may be distributed among two or more separate devices, which may be remotely located and/or configured for coordinated processing. Aspects of logic subsystem 1702 may be virtualized and executed by remotely accessible, networked computing devices configured in a cloud-computing configuration.

Storage subsystem 1704 includes one or more physical devices configured to hold instructions executable by logic subsystem 1702 to implement the methods and processes described herein. When such methods and processes are implemented, the state of storage subsystem 1704 may be transformed—e.g., to hold different data.

Storage subsystem 1704 may include removable and/or built-in devices. Storage subsystem 1704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1704 may include volatile, nonvolatile, dynamic, static, read/write, read-only, random-access, sequential-access, location-addressable, file-addressable, and/or content-addressable devices.

It will be appreciated that storage subsystem 1704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1702 and storage subsystem 1704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1706 may be used to present a visual representation of data held by storage subsystem 1704. As the herein described methods and processes change the data held by the storage machine, and thus transform the state of the storage machine, the state of display subsystem 1706 may likewise be transformed to visually represent changes in the underlying data. Display subsystem 1706 may include one or more display devices utilizing virtually any type of technology. Such display devices may be combined with logic subsystem 1702 and/or storage subsystem 1704 in a shared enclosure, or such display devices may be peripheral display devices.

When included, input subsystem 1708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1710 may be configured to communicatively couple computing system 1700 with one or more other computing devices. Communication subsystem 1710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1700 to send and/or receive messages to and/or from other devices via a network such as the Internet.

Another example provides a camera system coupled to a display device, the camera system comprising a housing, a sensor assembly arranged within the housing and rotatable with respect to the housing, the sensor assembly comprising an image sensor configured to obtain image data for display by the display device, and a manual rotation mechanism coupled to the sensor assembly, the manual rotation mechanism configured to be manually actuated from outside the housing to rotate the sensor assembly with respect to the housing. The manual rotation mechanism may additionally or alternatively include a gear system. The camera system may additionally or alternatively include one or more magnets within the housing configured to stop rotation of the sensor assembly. The manual rotation mechanism may additionally or alternatively include a structure configured to receive an external tool to actuate the manual rotation mechanism and rotate the sensor assembly with respect to the housing. The structure may additionally or alternatively include a hex socket configured to receive a hex key. The sensor assembly may additionally or alternatively include a sensor printed circuit board configured to rotate with the sensor assembly via the manual rotation mechanism. The camera system may additionally or alternatively include an image signal processor printed circuit board spaced from and electrically connected to the sensor printed circuit board. The image signal processor printed circuit board may additionally or alternatively be electrically connected to the sensor printed circuit board via a flexible ribbon cable. The camera system may additionally or alternatively include a plate interposed between the image signal processor printed circuit board and the sensor printed circuit board, wherein the plate comprises an opening through which the flexible ribbon cable extends. The plate may additionally or alternatively include a rack gear that is a component of the manual rotation mechanism. The image signal processor printed circuit board may additionally or alternatively be mounted to the housing, and the sensor assembly may additionally or alternatively be rotatable with respect to the image signal processor printed circuit board. The housing may additionally or alternatively be removably coupled to the display device.

Another example provides a method of operating a camera system having a rotatable sensor assembly arranged within a housing of the camera system, the method comprising, while the rotatable sensor assembly is in a first sensor orientation, obtaining image data via an image sensor of the rotatable sensor assembly and outputting the image data to a display having a first display orientation, receiving an actuating input via a manual rotation mechanism coupled to the rotatable sensor assembly, wherein the actuating input causes rotation of the rotatable sensor assembly relative to the housing of the camera system from the first sensor orientation to a second sensor orientation, and while the rotatable sensor assembly is in the second sensor orientation, obtaining image data via the image sensor of the rotatable sensor assembly and outputting the image data to the display having the first display orientation. A field of view of the camera system in the first sensor orientation and the display in the first display orientation may additionally or alternatively have a matching aspect ratio. A field of view of the camera system in the second sensor orientation and the display in the first display orientation may additionally or alternatively have different aspect ratios.

Another example provides a display device, comprising a display, and a camera system configured to obtain image data for display by the display, the camera system comprising a housing, a sensor assembly arranged within the housing and rotatable with respect to the housing, and a manual rotation mechanism coupled to the sensor assembly, the manual rotation mechanism configured to be manually actuated from outside the housing to rotate the sensor assembly with respect to the housing. The camera system may additionally or alternatively be removably mounted to the display device. The display may additionally or alternatively be configured to display image data received from the camera system based on an orientation of the sensor assembly with respect to the housing of the camera system. The manual rotation mechanism may additionally or alternatively include a structure configured to receive an external tool to actuate the manual rotation mechanism and rotate the sensor assembly with respect to the housing. The sensor assembly may additionally or alternatively include a sensor printed circuit board configured to rotate with the sensor assembly via the manual rotation mechanism, the camera system may additionally or alternatively include an image signal processor printed circuit board mounted to the housing, spaced from and electrically connected to the sensor printed circuit board, and the image signal processor printed circuit board may additionally or alternatively be electrically connected to the sensor printed circuit board via a flexible ribbon cable.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A camera system coupled to a display device, the camera system comprising:
a housing;
a sensor assembly arranged within the housing and rotatable with respect to the housing, the sensor assembly comprising an image sensor configured to obtain image data for display by the display device; and
a manual rotation mechanism coupled to the sensor assembly, the manual rotation mechanism configured to be manually actuated from outside the housing to rotate the sensor assembly with respect to the housing between a portrait orientation and a landscape orientation.

2. The camera system of claim 1, wherein the manual rotation mechanism comprises a gear system.

3. The camera system of claim 1, further comprising one or more magnets within the housing configured to stop rotation of the sensor assembly.

4. The camera system of claim 1, wherein the manual rotation mechanism comprises a structure configured to receive an external tool to actuate the manual rotation mechanism and rotate the sensor assembly with respect to the housing.

5. The camera system of claim 4, wherein the structure comprises a hex socket configured to receive a hex key.

6. The camera system of claim 1, wherein the sensor assembly comprises a sensor printed circuit board configured to rotate with the sensor assembly via the manual rotation mechanism.

7. The camera system of claim 6, further comprising an image signal processor printed circuit board spaced from and electrically connected to the sensor printed circuit board.

8. The camera system of claim 7, wherein the image signal processor printed circuit board is electrically connected to the sensor printed circuit board via a flexible ribbon cable.

9. The camera system of claim 8, further comprising a plate interposed between the image signal processor printed circuit board and the sensor printed circuit board, wherein the plate comprises an opening through which the flexible ribbon cable extends.

10. The camera system of claim 9, wherein the plate comprises a rack gear that is a component of the manual rotation mechanism.

11. The camera system of claim 7, wherein the image signal processor printed circuit board is mounted to the housing, and wherein the sensor assembly is rotatable with respect to the image signal processor printed circuit board.

12. The camera system of claim 1, wherein the housing is removably coupled to the display device.

13. A method of operating a camera system having a rotatable sensor assembly arranged within a housing of the camera system, the method comprising:
while the rotatable sensor assembly is in a first sensor orientation, obtaining image data via an image sensor of the rotatable sensor assembly and outputting the image data to a display having a first display orientation;
receiving an actuating input via a manual rotation mechanism coupled to the rotatable sensor assembly, wherein the actuating input causes rotation of the sensor assembly relative to the housing of the camera system from the first sensor orientation to a second sensor orientation; and while the sensor assembly is in the second sensor orientation, obtaining image data via the image sensor of the sensor assembly and outputting the image data to the display having the first display orientation,
wherein a field of view of the camera system in the second sensor orientation and the display in the first display orientation have different aspect ratios.

14. The method of claim 13, wherein a field of view of the camera system in the first sensor orientation and the display in the first display orientation have a matching aspect ratio.

15. A display device, comprising:
a display; and
a camera system configured to obtain image data for display by the display, the camera system comprising
a housing,
a sensor assembly arranged within the housing and rotatable with respect to the housing, and
a manual rotation mechanism coupled to the sensor assembly, the manual rotation mechanism comprising a gear system configured to be manually actuated from outside the housing to rotate the sensor assembly with respect to the housing between a portrait orientation and a landscape orientation.

16. The display device of claim 15, wherein the camera system is removably mounted to the display device.

17. The display device of claim 15, wherein the display is configured to display image data received from the camera system based on an orientation of the sensor assembly with respect to the housing of the camera system.

18. The display device of claim 15, wherein the manual rotation mechanism comprises a structure configured to receive an external tool to actuate the manual rotation mechanism and rotate the sensor assembly with respect to the housing.

19. The display device of claim 15, wherein the sensor assembly comprises a sensor printed circuit board configured to rotate with the sensor assembly via the manual rotation mechanism, further comprising an image signal processor printed circuit board mounted to the housing, spaced from and electrically connected to the sensor printed circuit board, and wherein the image signal processor printed circuit board is electrically connected to the sensor printed circuit board via a flexible ribbon cable.

* * * * *